United States Patent [19]

Ohmori

[11] 4,391,452

[45] Jul. 5, 1983

[54] CONTROL CIRCUIT FOR VEHICLE LEVELING SYSTEM

[75] Inventor: Taiji Ohmori, Kawagoe, Japan

[73] Assignee: Honda Giken Kogyo Kabushiki Kaisha, Tokyo, Japan

[21] Appl. No.: 225,777

[22] Filed: Jan. 16, 1981

[30] Foreign Application Priority Data

Jan. 17, 1980 [JP] Japan .................................. 55-3965

[51] Int. Cl.³ ............................................ B60G 11/26
[52] U.S. Cl. ................................ 280/6.1; 267/64.28; 280/707
[58] Field of Search .............. 280/6 R, 6 H, 6.1, 6.11, 280/707; 267/64.28

[56] References Cited

U.S. PATENT DOCUMENTS

| | | | |
|---|---|---|---|
| 4,017,099 | 4/1977 | Hegel | 280/707 |
| 4,054,295 | 10/1977 | Elliott | 280/707 |
| 4,105,216 | 8/1978 | Graham | 280/707 |
| 4,150,299 | 4/1979 | Kasiewicz | 280/707 |
| 4,164,664 | 8/1979 | Kasiewicz | 280/707 |
| 4,168,840 | 9/1979 | Graham | 280/707 |
| 4,333,668 | 6/1982 | Hendrickson | 280/703 |

Primary Examiner—Joseph F. Peters, Jr.
Assistant Examiner—John A. Carroll
Attorney, Agent, or Firm—Irving M. Weiner; Pamela S. Burt; John L. Shortley

[57] ABSTRACT

A control circuit for a vehicle leveling system which operates to restore the vehicle height to be within a reference vehicle height range. The control circuit comprises a first detecting device which detects the direction of change in the vehicle height, a second detecting device which determines the necessity of levelling operation, a logic circuit which properly controls the leveling operation in response to outputs of the first and second detecting devices, and a holding circuit which increases the duration of an OFF signal so as to render the pneumatic system of the vehicle to be inoperative, for a predetermined length of time. The control circuit effects adjustment in height in response to those changes in vehicle height which inherently require adjustment and avoids any adjustment in response to those changes in vehicle height which naturally occur instantaneously under normal driving conditions.

8 Claims, 8 Drawing Figures

FIG. 8

| | | I | II | III | IV | V | VI | VII | VIII | IX |
|---|---|---|---|---|---|---|---|---|---|---|
| Input | 1 A | 1 | 0 | 1 | 0 | 1 | 0 | 0 | 0 | 0 |
| | 1 B | 1 | 0 | 0 | 1 | 0 | 1 | 0 | 0 | 0 |
| | 4 A | 0 | 0 | 0 | 0 | 0 | 1 | 0 | 1 | 1 |
| | 4 B | 0 | 0 | 0 | 0 | 1 | 0 | 1 | 0 | 1 |
| Output | Decompression means | 0 | 1 | 0 | 0 | 0 | 0 | 1 | 1 | 0 |
| | Compression means | 1 | 0 | 1 | 1 | 1 | 1 | 0 | 0 | 0 |
| | Actuator (front) | 1 | 1 | 1 | 0 | 1 | 0 | 1 | 0 | 0 |
| | Actuator (rear) | 1 | 1 | 0 | 1 | 0 | 1 | 0 | 1 | 0 |

CONTROL CIRCUIT FOR VEHICLE LEVELING SYSTEM

BACKGROUND OF THE INVENTION

1. Field of the Invention

The present invention relates generally to a control circuit for a vehicle leveling system which properly adjusts the height of a vehicle body in response to changes therein.

2. Description of Relevant Art

A known type of vehicle leveling system incorporates a device, actuated by the pressure of fluid, which assists a suspension mechanism for always maintaining the height of a vehicle at a constant level, with the height of the vehicle body supported by the suspension mechanism being varied in accordance with changes in loads on the vehicle body. For a vehicle leveling system of this type, various control circuits are known which function to operate the vehicle leveling system to effect inherently required adjustments of vehicle height to maintain the aforesaid constant level, but to avoid operating the leveling system in response to changes in vehicle height which ordinarily occur during travel of the vehicle.

A recent exemplary control circuit for a vehicle leveling system of the aforesaid type is disclosed in U.S. Pat. No. 4,105,216. Such control circuit includes a detector which detects the vehicle height and generates a pair of signals (0, 0) when the vehicle height is above a predetermined range; a pair of signals (0, 1) when the height is within the predetermined height range; or a pair of signals (1, 1) when the height is below the predetermined height range, thereby controlling a vehicle leveling system to properly restore the vehicle height, when the signals (0, 0) or (1, 1) are generated, to be within the predetermined height range. More specifically, when either pair of signals (0, 0) or (1, 1) is generated, a delay timer circuit is operated through a NOT gate and/or an AND gate according to the combination of signals, so as to actuate the vehicle leveling system only after a delay time which is preset in the delay timer circuit has elapsed.

With the above-described arrangement, the control circuit determines, by comparing the delay time and a duration of the detected signal pair (0, 0) or (1, 1) indicating a change in the vehicle height, whether the detected signal pair is an ordinary one during travel or a particular one requiring an adjustment of vehicle height. If the duration of the detected signal pair (0, 0) or (1, 1) is shorter than the delay time, the control circuit functions to hold the vehicle leveling system in an inoperative condition.

Generally, the aforesaid vehicle leveling system, when provided on a passenger car, maintains the desired or proper vehicle height, thus improving the riding comfort and increasing the product value of the passenger car. It is also generally attempted to improve the riding comfort by enabling the control circuit to more finely adjust the vehicle height according to the changes in vehicle height. For example, the delay timer may be employed to delay the operation of the vehicle leveling system for a certain length of time, as described hereinabove.

However, technically conflicting demands arise with respect to a vehicle leveling system of the aforesaid type and its control circuit. One such demand resides in achieving a more accurate and precise vehicle height adjustment so as to increase the product value of a passenger car; while another demand is to simplify the vehicle leveling system and its control circuit so as to reduce the number of parts and elements as well as the manufacturing cost. In other words, it is desired to provide a more accurate, fine and advanced vehicle height adjustment while at the same time minimizing the expense and simplifying the construction with respect to the vehicle leveling system including the control circuit.

In view of the above considerations, the aforesaid known control circuit has a number of attendant disadvantages. Because the delay timer circuit includes an oscillator-operated hexadecimal binary counter, which fundamentally comprises four flip-flop circuits, it comprises a relatively complex and expensive digital circuit. Moreover, the necessary use of a plurality of such digital circuits results in a considerable increase in total cost. Further, the aforesaid control circuit is designed so as to function according to the combination of pairs of signals from a detector, thus resulting in complicated wiring and overall circuitry complexity. In addition, when a more complex and higher control is made by using such control circuits, for example, when an independent vehicle height adjustment is effected at each of the front and rear sides of an automobile according to respective changes in vehicle height or when vehicle height adjustments are effected at a plurality of points, there will naturally result further undesirable increases in manufacturing cost and circuitry complexity.

Due to the foregoing disadvantages attendant known circuitry, there has now developed a desideratum for a more simplified, reliable and low-cost control circuit for a vehicle leveling system which can operate favorably according to the complexity of actual change in vehicle height.

The present invention provides an improved control circuit for a vehicle leveling system which effectively fulfills the aforesaid desideratum.

SUMMARY OF THE INVENTION

The present invention provides a control circuit for a vehicle leveling system to restore a vehicle height to be within a reference vehicle height range by operating either a first drive means to raise a vehicle body or a second drive means to lower it when the vehicle height is out of the reference vehicle height range. The control circuit comprises a first detecting means for generating a directional signal of vehicle height change in the form of either a HIGH signal or a LOW signal, and a second detecting means for generating a command signal of vehicle height adjustment in the form of either an OFF signal or an ON signal. Also provided is a main circuit means for selecting for operation either the first drive means to raise the vehicle height or the second drive means to lower the vehicle height in response to the directional signal, and for determining whether or not the drive means is to be actuated. A holding circuit means is connected between the second detecting means and the main circuit means, and functions to increase the duration of the OFF signal for a predetermined length of time when the OFF signal appears instantaneously, and to transmit the OFF signal with such duration to the main circuit means.

In accordance with the invention there is provided a control circuit for a vehicle leveling system wherein the first detecting means generates a directional signal of vehicle height change and the second detecting means generates a command signal of vehicle height adjustment. The directional signal serves to select for operation either a drive means for raising the vehicle height or a drive means for lowering the vehicle height, and the command signal serves to determine the actuation of that one of the drive means which is selected by the directional signal. A circuit comprising a monostable multivibrator and a NOR gate receives the command signal from the second detecting means, and holds for a predetermined period the duration of an OFF signal of vehicle height adjustment instantaneously appearing in the command signal of vehicle height adjustment.

Accordingly, the present invention provides a control circuit for a vehicle leveling system which is simplified and reduced in production cost, and which can serve as a basic circuit for use in more elaborate control circuits for vehicle leveling systems of higher levels, thereby allowing more complicated vehicle height adjustments.

The above and other objects, details and advantages of the present invention will become more apparent from the following detailed description of preferred embodiments of the present invention, when read in conjunction with the accompanying drawings.

BRIEF DESCRIPTION OF THE DRAWINGS

FIG. 8 is a truth table for explaining the function of the control circuit shown in FIG. 7.

DETAILED DESCRIPTION OF PREFERRED EMBODIMENTS

In general, a vehicle leveling system is provided so as to keep a relative distance between non-elastically-supported and elastically-supported components of a chassis spring at a suspension mechanism within a predetermined distance range, i.e., to keep the height of an elastically suspended vehicle body with respect to the road surface within a predetermined range (hereinafter referred to as a reference vehicle height range). Therefore, when the vehicle height is out of the reference vehicle height range, in other words, when it is lower or higher than the reference vehicle height range, the vehicle leveling system operates to shift the vehicle height into the reference vehicle height range. A vehicle leveling system to which the present invention is applied comprises detecting means to detect the vehicle height, a drive means comprising a compression means and a decompression means to increase and decrease the vehicle height, respectively, pneumatic means actuated by the drive means, and a main circuit to control the operation of the whole system according to actual conditions.

Figure 1:
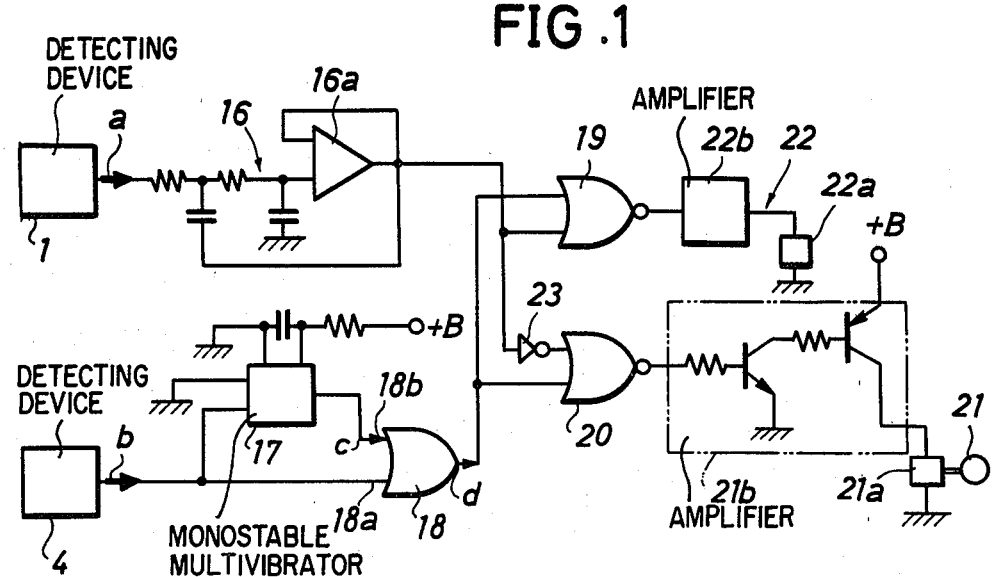
FIG. 1 is a diagram of a basic control circuit for a vehicle leveling system, in accordance with a first embodiment of the present invention.
Figure 4:
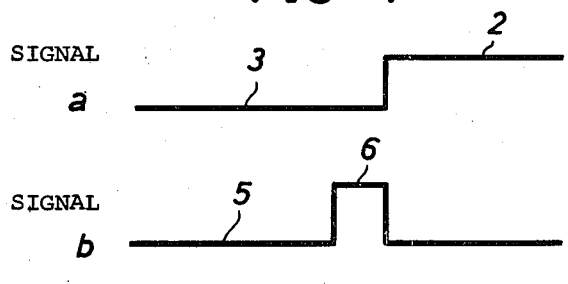
FIG. 4 illustrates respective signal waves generated by the detecting devices according to the invention.

Referring now to FIG. 1, a first detecting device 1 generates a LOW signal, expressed by a true value "1", when detecting that the vehicle height is lower than a reference vehicle height range; and generates a HIGH signal, expressed by a true value "0", when detecting that the vehicle height is above the reference vehicle height range. It is ensured that the detecting device 1 outputs the HIGH signal when the vehicle height stays within the reference vehicle height range. In other words, the detecting device 1 generates a directional signal "a" of vehicle height change (hereinafter referred to as a directional signal) which takes either the true value "1" as a LOW signal 3, or the true value "0" as a HIGH signal 2, as shown in FIG. 4.

A second detecting device 4 generates an ON signal of vehicle height adjustment (hereinafter referred to as an ON signal and expressed by a true value "0") when detecting that the vehicle height is out of the reference vehicle height range, i.e., when it is above or below the reference vehicle height range, and generates an OFF signal of vehicle height adjustment (hereinafter referred to as an OFF signal and expressed by a true value "1") when detecting that the vehicle height is within the reference vehicle height range. In other words, the detecting means 4 generates a command signal "b" of vehicle height adjustment (hereinafter referred to as a command signal) which takes either the true value "0" as an ON signal 5 or the true value "1" as an OFF signal 6, as shown in FIG. 4.

Figure 3:
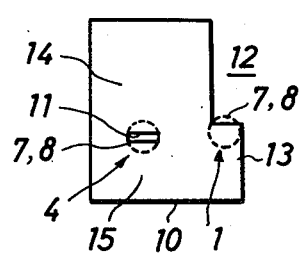
FIG. 3 is a view as seen from the direction of arrow A in FIG. 2.
Figure 2:
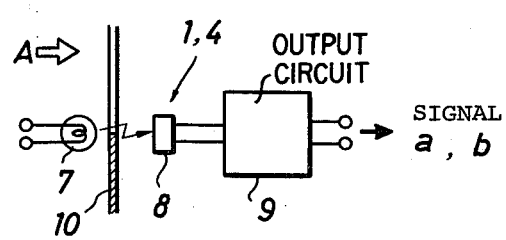
FIG. 2 depicts an embodiment of first and second detecting devices in accordance with the invention.

A detailed embodiment of the detecting device 1 and the detecting device 4 is shown in FIGS. 2 and 3. Two output circuits 9 are provided, each having a light-emitting element 7, such as an increment lamp or an LED, disposed at an arbitrary location on a non-elastically-supported part of the vehicle, and a light-receiving element 8, such as a photo-transistor or CdS, disposed so as to face the light-emitting element 7. A light-shielding plate 10 is mounted substantially vertically on an elastically-supported part (an elastically suspended automobile body) between the light-emitting element 7 and the light-receiving element 8. The light-shielding plate 10 is formed, between a first pair of the light-emitting element 7 and the light-receiving element 8, with a horizontal slit 11 of a predetermined gap having a normal position at a predetermined level and, between a second pair of the light-emitting element 7 and the light-receiving element 8, with a light-passing recess 12 defined by the boundary of a light-shielding part 13 having a normal position at a predetermined level. The gap of the slit 11 provides the aforesaid reference vehicle height range. The slit 11 determines a level of the command signal "b" to be transmitted from the detecting device 4 according to a relative motion between the light-shielding plate 10 and the light-receiving element 8. On the other hand, the light-passing recess 12 as well as the light-shielding part 13 determines a directional signal "a" to be transmitted from the detecting device 1.

The OFF signal 6 is generated when the slit 11 permits a beam to pass from the light-emitting element 7 and the light-receiving element 8, both comprising the detecting device 4, while the ON signal 5 is generated when a plate portion 14 or 15 excluding the slit 11 blocks the beam. Likewise, the LOW signal 2 is generated when the light-passing recess 11 is located between the light-emitting element 7 and the light-receiving element 8, both comprising the detecting device 1, while the HIGH signal 3 is generated when the light-shielding part 13 is located between them.

As described hereinabove, the detecting devices 1 and 4 which comprise respective light-shielding plates, light-emitting elements, light-receiving elements and output circuits are provided to generate the directional signal "a" and the command signal "b". These detecting devices 1 and 4 may be replaced with other detecting means, for example, a detecting device employing magnetism or an On-Off circuit using high-frequency oscillation, generally referred to as a noncontact switch.

Although two detecting means responsible for the directional signal "a" and the command signal "b" are provided in a pair employing a single light-shielding plate in the above-described embodiment, the method for determining and generating such signals "a" and "b" may be selected arbitrarily and separately since such signals are different in nature and permit independent handling as described hereinbelow.

Also shown in FIG. 1 is a low-pass filter 16 which eliminates high-frequency waves from the directional signal generated by the device 1. A monostable multivibrator 17 serves to output a pulse with a given pulse width "t" at each fall of the OFF signal 6 which appears instantaneously during travel of the vehicle in the command signal "b" transmitted from the detecting device 4. An output of the detecting device 4 and that of the monostable multivibrator 17 are given to an OR gate 18. With the vibrator 17 and the gate 18 extending a pulse width of the instantaneous OFF signal 6, there is thus formed a circuit for holding the duration of the OFF signal for a given length of time.

FIG. 1 further shows NOR gates 19 and 20 which cooperate to select for operation either a compression means 21 or a decompression means 22 in response to the directional signal "a", and at the same time to determine the thus selected means 21 or 22 to be on or off in response to the command signal "b". When the gate 20 outputs "1", the compression means 21 is actuated; and when the gate 19 outputs "1", the decompression means 22 is actuated. An output of the low-pass filter 16 and that of the gate 18 are given to the gates 19 and 20 as inputs thereof. A NOT circuit 23 is provided between the low-pass filter 16 and the gate 20 to avoid simultaneous generation of an output "1" from both the gates 19 and 20.

The compression means 21 comprises a drive which functions to increase the vehicle height and includes a compressed air generating device, such as a compressor, with a valve means. When such valve means is open, compressed air is supplied to a pneumatic means (not shown) mounted on a suspension mechanism so as to raise the vehicle body. The compression means 21 is shown in FIG. 1 as being provided with a compression solenoid valve 21a and an amplifier 21b which amplifies a signal to actuate the solenoid valve 21a.

The decompression means 22 comprises a drive which functions to decrease the vehicle height and includes a decompression solenoid valve 22a which discharges to the atmosphere the compressed air normally supplied to the pneumatic means at the suspension mechanism, and is provided with an amplifier 22b which amplifies a signal to actuate the solenoid valve 22a.

The operation of the control circuit for the vehicle leveling system is described in detail hereinbelow.

When the vehicle height is within the reference vehicle height range when the vehicle is parked, the detecting device 1 continuously transmits the directional signal "a" in the form of a HIGH signal "0", and the detecting device 4 continuously transmits the command signal "b" in the form of an OFF signal "1". Therefore, even when lowering the HIGH signal "0" and an inverted signal "1" are transmitted to the gates 19 and 20, respectively, through the low-pass filter 16, neither of the gates 19 and 20 output a signal "1" since the OFF signal "1" is transmitted continuously to both the gates 19 and 20 through the gate 18, resulting in no operation of the compression means 21 and the decompression means 22.

Because the vehicle height is lower than the reference vehicle height range when a number of passengers are seated in the parked vehicle or when a heavy load is placed on the parked vehicle, the detecting device 1 continuously generates the directional signal "a" in the form of a LOW signal "1", while the detecting means 4 continuously generates the command signal "b" in the form of an ON signal "0". The LOW signal "1" is transmitted to the gates 19 and 20 through the low-pass filter 16. The LOW signal "1" is inverted to "0" through NOT circuit 23 before reaching the gate 20, while being transmitted directly to the gate 19, keeping the signal level "1", so that an output of the gate 19 never becomes "1". As a result, the decompression means 22 does not operate. The ON signal "0" is given directly to an input terminal 18a of the gate 18, while another terminal 18b of the gate 18 receives an input signal "0" after a predetermined length of time has elapsed. As a result, the gate 18 outputs a signal "0", which is transmitted to another input terminal of the gate 20. Therefore, because both inputs of the gate 20 are "0", the gate 20 outputs a signal "1". By this signal, the compression means 21 is actuated to supply the compressed air for raising the vehicle body to a height within the reference vehicle height range. After the vehicle height is increased to be within the reference vehicle height range, the detecting device 4 continuously generates an OFF signal "1" to shut down the compression means 21.

When a number of passengers exit from or a heavy load is unloaded from the parked vehicle, the vehicle height will be raised above the reference vehicle height range due to the compressed air previously supplied to the compression means 21 provided at the suspension mechanism as described above. In such case, the detecting device 1 continuously generates the directional signal "a" in the form of a HIGH signal "0", while the detecting device 4 continuously generates the command signal "b" in the form of an ON signal "0" as described above. Therefore, according to the above-mentioned principle of operation, the decompression means 22 is selected by the HIGH signal "0", and is operated due to the ON signal "0", thus adjusting the vehicle height. After the vehicle height is decreased to be within the reference vehicle height range, the detecting device 4 continuously outputs an OFF signal "1" to shut down the decompression means 22.

Figure 5:
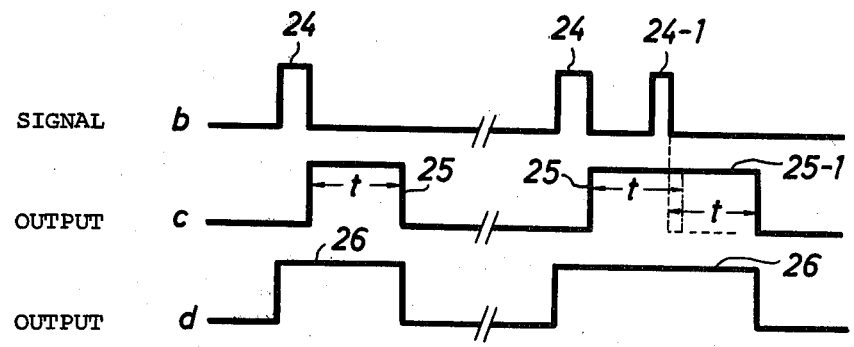
FIG. 5 illustrates a relation of signals appearing at a holding circuit in the control circuit according to the invention.

The operation of the present control circuit during travel of the vehicle will now be described in detail hereinbelow. During travel, the vehicle body moves up and down due to engine vibrations, road surfaces fluctuations, etc. Therefore, the detecting device 1 generates a directional signal "a" in which a LOW signal "1" and a HIGH signal "0" alternate frequently or instantaneously with each other. The detecting device 4 generates a command signal "b" in which an OFF signal "1" and an ON signal "0" alternate frequently or instantaneously with each other. Although the detecting device 4 produces the command signal "b" in which the OFF signal and the ON signal alternate instantaneously with each other during travel of the vehicle, the monostable multivibrator 17 provided between the output terminal of the detecting device 4 and one input terminal 18b of the gate 18 serves to generate a pulse 25 with a given width starting at the fall of an OFF signal "1" (24) when such OFF signal is generated instantaneously as shown in FIG. 5, and transmits same to the remaining input terminal 18a of the gate 18. As a result, an output terminal "d" of the gate 18 gives a pulse 26 having a width of the duration of the OFF signal "1" (24) plus the width of the pulse 25. In this manner, the generation of the signal "0" can be delayed for a desired length of time.

Even after the compression means 21 or the decompression means 22 is selected to be operative by the directional signal "a", the selected means 21 or 22 still remains inoperative while the pulse 26 at the output "d" of the gate 18, generated by the monostable multivibrator 17 according to the OFF signal "1" (24), is transmitted to the gates 19 and 20. Therefore, the vehicle leveling system does not operate in response to changes in the vehicle height which ordinarily occur during travel.

The increase in pulse width of the instantaneous OFF signal "1" (24) can be deemed as an enlargement of the reference vehicle height range which is limited within the gap of the slit 11. Thus, the vehicle leveling system does not operate in response to ordinary instantaneous changes in vehicle height caused during travel when the reference vehicle height range is expanded so as to lower the sensitivity of the vehicle leveling system.

With reference to FIG. 5, when an instantaneous OFF signal "1" (24-1) appears in the duration of a pulse 25, a pulse 25-1 is to be added to the pulse 25. With such a circuit, the width of pulse 24 is further increased, and the actuation of the vehicle leveling system can be automatically delayed accordingly, so as to ensure that the vehicle leveling system will not operate in response to those changes in vehicle height which ordinarily occur during travel.

From the foregoing description, it will be understood that the following technical advantages can be obtained from the first embodiment of the present invention.

First, two independent signals are generated: one being a directional signal for vehicle height change which selects either a drive which increases the vehicle height or one which decreases it; the other being a command signal for leveling operation which controls the operation of the selected drive. In this manner, the structure of the control circuit is simplified, and the number of logical elements is reduced.

Secondly, the vehicle leveling system will not be actuated when natural changes in vehicle height occur, due to connection of a circuit comprising a monostable vibrator and an OR gate to the output of the detecting device which generates the command signal for leveling operation. Therefore, similar to the foregoing advantage, the structure of the control circuit can be simplified, and the number of logical elements is reduced.

According to the above set forth first and second technical advantages, reduction in the number of parts provides for reduction in manufacturing cost, and the simplicity of the circuit provides for reduction of assembly steps and an increase in production efficiency.

Furthermore, by combining a plurality of the foregoing control circuits having the aforesaid advantages, a control circuit capable of complicated adjustment of vehicle height can be obtained. Thus, the control circuit in accordance with the present invention is capable of making an optimum adjustment of the vehicle height.

A second modified embodiment of the present invention will now be described with reference to FIGS. 6 through 8.

A control circuit for the vehicle leveling system in accordance with the second embodiment of the invention comprises the above-mentioned first embodiment at its heart, and further comprises two pairs of the detecting devices 1 and 4 located at the front and rear of the vehicle body, respectively, thereby adjusting abnormal changes in vehicle height at the front and rear of the vehicle body separately from each other.

Figure 6:
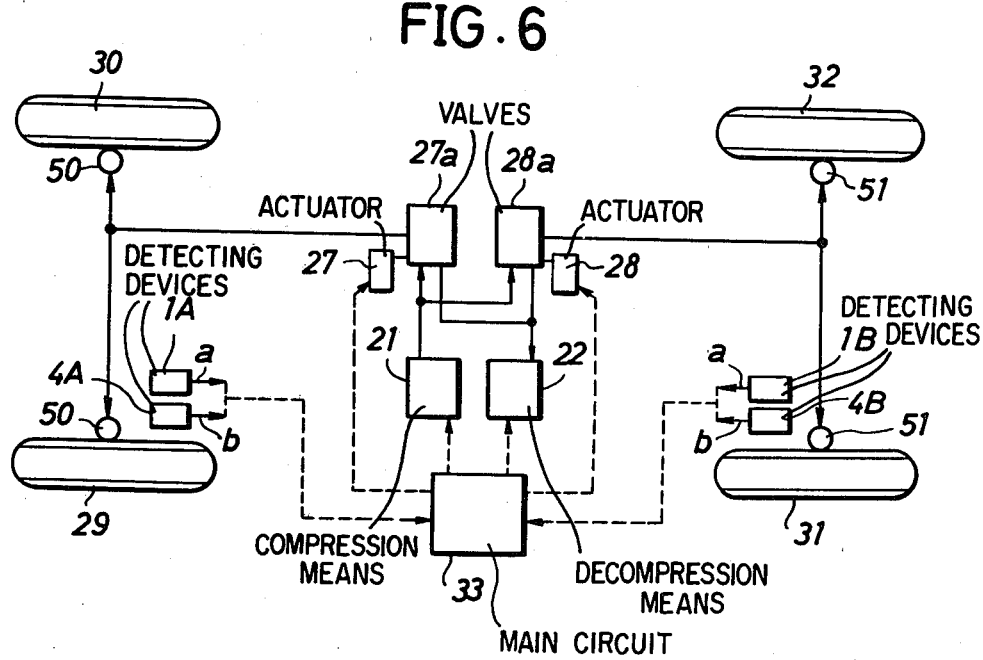
FIG. 6 is a block diagram showing the construction of a vehicle leveling system, in connection with a second embodiment of the invention.

In this embodiment, as shown in FIG. 6, actuators 27 and 28 are provided for valves 27a, 28a which separately connect pneumatic means 50, 51, such as air cylinders attached to the front and rear suspension mechanisms of the vehicle, to compression means 21, such as an air compressor, and decompression means 22, such as a relief valve, in response to changes in vehicle height; and thereby the actuators 27 an 28 adjust the height at the front and rear of the vehicle. The valves 27a, 28a associated with the actuators 27 and 28 are connected at first ends thereof to the compression means 21 and decompression means 22, respectively. At the other ends thereof, the valve 27a is connected to the pneumatic means 50 provided at the suspension mechanism for the front wheels 29 and 30, while the valve 28a is connected to the pneumatic means provided at the suspension mechanism for the rear wheels 31 and 32.

A main circuit 33 receives directional signals "a" and command signals "b" transmitted from the detecting devices 1A and 4A provided at the front of the vehicle, and from detecting means 1B and 4B provided at the rear of the vehicle. According to these signals, the main circuit 33 outputs signals to operate the compression means 21 and the decompression means 22, and further to operate the actuators 27 and 28 separately from the means 21 and 22, for leveling the vehicle. It will thus be understood that the second embodiment of the invention is modified to include additional components such as the pair of detecting devices, actuators and main circuit.

Figure 7:
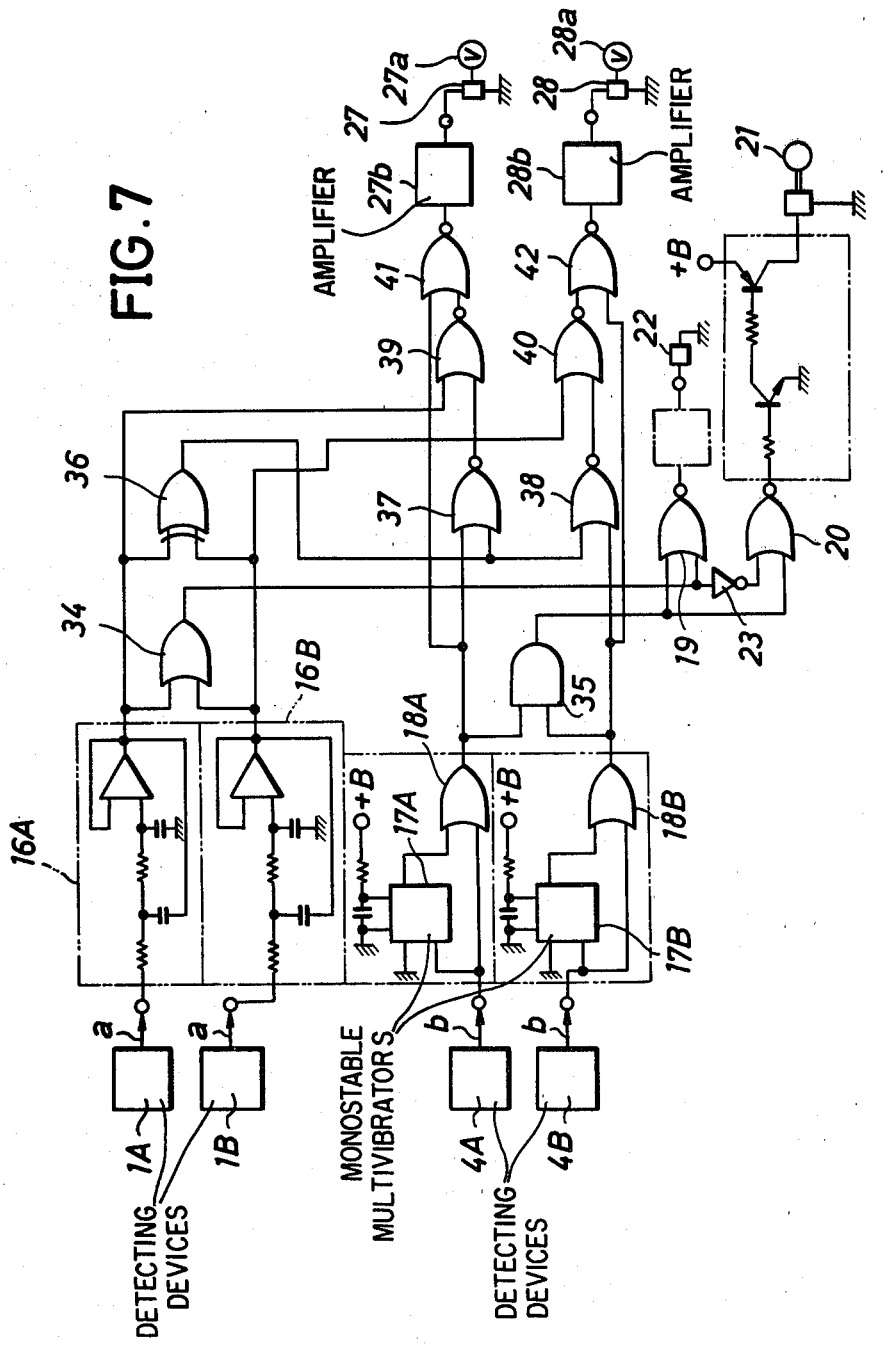
FIG. 7 is a control circuit diagram for the vehicle leveling system shown in FIG. 6, in accordance with the second embodiment of the invention.

A detailed example of the main circuit for the second embodiment is illustrated in FIG. 7, wherein elements corresponding to those in FIG. 1 are designated by like reference numerals.

The detecting devices 1A and 1B generate signals "a", which are treated through low-ass filters 16A and 16B, and an OR gate 34. An output of the OR gate 34 is transmitted to one of the input terminals of respective gates 19 and 20, with a NOT circuit 23 being provided before the input terminal of the gate 20. The detecting devices 4A and 4B generate signals "b", which are treated through respective circuits comprising monostable multivibrators 17A and 17B and gates 18A and 18B, which hold their OFF signals by increasing the durations of the OFF signals for a predetermined length of time. An output of a gate 35 is transmitted to the remaining input terminal of respective gates 19 and 20. The decompression means 22 is connected to the output side of the gate 19, and the compression means 21 is connected to the output side of the gate 20.

With the above-described circuit arrangement, the vehicle height is adjusted in accordance with the same principles of the first embodiment, by selecting either the compression means 21 or the decompression means 22, and controlling the operation thereof according to output signals generated by the detecting devices.

Outputs of the low-pass filters 16A and 16B are transmitted to an exclusive OR gate 36, and an output of the exclusive OR gate 36 is further transmitted to one of the input terminals of respective NOR gates 37 and 38. Outputs of the gates 18A and 18B are transmitted to the remaining input terminals of gates 37 and 38, respectively. The output of the low-pass filter 16A is transmitted to one of the input terminals of a NOR gate 39, and the output of the low-pass filter 16B is transmitted to one of the input terminals of a NOR gate 40. An output of the gate 37 is transmitted to the remaining input terminal of the gate 39, and an output of the gate 38 is transmitted to the remaining input terminal of the gate 40. Outputs of the gate 39 and the gate 18A are transmitted to an input terminal of a NOR gate 41, and an output of the gate 41 is transmitted to the actuator 27 for a valve 27a which adjusts the height at the front of the vehicle body. An amplifier 27b amplifies signals to actuate the valve 27a. Outputs of the gate 40 and the gate 18B are transmitted to input terminals of a NOR gate 42, and an output of the gate 42 is transmitted to the actuator 28 for a valve 28a which adjusts the height at the rear of the vehicle body. An amplifier 28b amplifies signals to actuate the valve 28a.

With the above-described circuit arrangement, either the actuator 27 or the actuator 28 is selected and operated by signals generated by the detecting devices 1A, 1B, 4A and 4B, in a manner described in detail hereinbelow.

The operation of the control circuit employed in the second embodiment of the invention will be described for the following nine input conditions I to IX, with reference to the truth table shown in FIG. 8.

I. Under this input condition, both the front and rear of the vehicle body are lowered, and the detecting devices 1A and 1B generate LOW signals "1", while the detecting devices 4A and 4B generate ON signals "0". In this case, output signals of the gates 34 and 35, determined from such signals, are transmitted to the gates 19 and 20. As a result, the output of the gate 20 becomes "1" by which the compression means 21 is selected and operated. According to the foregoing logic circuit, outputs of the gates 41 and 42 become "1" respectively, so that the valves 27a and 28a respectively associated with the actuators 27 and 28 are opened. As a result, the compressed air is supplied from the compression means 21 to the pneumatic means 50, 51 provided at the suspension mechanism for respective wheels 29, 30, 31 and 32 so as to raise the front and rear of the vehicle body to a predetermined level.

II. Under this input condition, both the front and rear of the vehicle body are raised, and the detecting devices 1A and 1B generate HIGH signals "0", while the detecting devices 4A and 4B generate ON signals "0". In this case, the output of the gate 19 becomes "1" by which the decompression means 22 is selected and operated. According to the foregoing logic circuit, outputs of the gates 41 and 42 become "1", so that the valves 27a and 28a are opened. As a result, the compressed air, normally supplied to the pneumatic means at the suspension mechanism for the wheels at the front and rear, is released to the atmosphere through the decompression means 22 so as to lower the front and rear of the vehicle body to the predetermined level.

III. Under this input condition, the front of the vehicle body is lowered, while the rear is raised. In this case, the detecting device 1A generates a LOW signal "1", the detecting device 1B generates a signal "0", and the detecting devices 4A and 4B generate ON signals "0". Therefore, an output of the gate 20 becomes "1" which actuates the compression means 21, and sets the output of the gate 41 to "1" and the output of the gate 42 to "0", thereby opening the valve 27a for the actuator 27 at the front so as to supply the compressed air from the compression means 21 to only the front for raising same. As described above, in this embodiment priority is given to adjustment of the lowered side when one side of the vehicle body is lowered and the other side is raised. However, this priority can be arbitrarily changed according to control requirements.

IV. Under this input condition, the front of the vehicle body is raised while the rear is lowered. In this case, contrary to the input condition III, the output of the gate 41 is set to "0", and the output of the gate 42 is set to "1", thereby opening the valve 28a for the actuator 28 at the rear so as to supply the compressed air from the compression means 21 to only the rear side for raising same.

V. Under this input condition, the front of the vehicle body is lowered while the rear is disposed at a normal height. In this case, adjustment is similar to that under the input condition III, i.e., the front of the vehicle body is raised to the predetermined level of the vehicle to restore a normal level of the vehicle body as a whole.

VI. Under this input condition, the front of the vehicle body is disposed at a normal height while the rear is lowered. In this case, adjustment is similar to that under the input condition IV, i.e., the rear of the vehicle body is raised to the predetermined level to restore the height of the entire vehicle body to a normal level.

VII. Under this input condition, the front of the vehicle body is raised while the rear is disposed at a normal height. In this case, the gate 19 outputs "1" to operate the decompression means 22, while the gate 41 outputs "1" and the gate 42 outputs "0" to open the valve 27a for the actuator 27. Thereby, the compressed air, normally supplied to the front, is released to the atmosphere so as to set the front of the vehicle body at a normal height.

VIII. Under this input condition, the front of the vehicle body is disposed at a normal height, while the rear is raised. In this case, contrary to the input condition VII, the decompression means 22 is operated and the valve 28a for the actuator 28 at the rear is opened so as to set the rear of the vehicle body at a normal height.

IX. Under this input condition, both the front and rear of the vehicle body are disposed at a normal height within the predetermined level range. Therefore, the operation of the compression means, decompression means, and front and rear actuators is not necessary.

As explained above, the control circuit illustrated in FIG. 7 is designed to make optimum adjustment in response to each of the combined height conditions between the front and rear of the vehicle body. With regard to normally occurring instantaneous changes in vehicle height, the circuit comprising the monostable multivibrators 17A and 17B and the OR circuit gates 18A and 18B, for holding instantaneous OFF signals for a predetermined length of time according to the operating principle of the foregoing basic circuit, is provided to stop the adjusting operation of the vehicle leveling system effectively, thus ensuring optimum adjustment of the vehicle height.

Location of the foregoing detecting means is not limited to the front and rear ends of the vehicle body, and vehicle height adjusting points are not limited to two points; i.e., a plurality of adjusting points can be arbitrarily chosen for adjustment purposes.

The following technical advantages are obtained from the second embodiment of the present invention.

First, the height of the entire vehicle body is always maintained within the desired vehicle level range by detecting changes in height at respective sides through the detecting devices. Therefore, accurate leveling of the vehicle can be made in response to changes in height.

Secondly, the control circuit includes the basic circuit for the first embodiment at its heart, and a pair of drives employing actuators which can adjust the height at a plurality of points. Thus, the circuit structure is simplified, reliability is improved, manufacture is facilitated, and manufacturing cost is reduced.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A control circuit for a vehicle leveling system to restore a vehicle height to be within a reference vehicle height range by operating either a first drive means to raise a vehicle body or a second drive means to lower the vehicle body when said vehicle height is out of said reference vehicle height range, comprising:
   a first detecting means for generating a directional signal of vehicle height change in the form of either a HIGH signal or a LOW signal;
   a second detecting means for generating a command signal of vehicle height adjustment in the form of either an OFF signal or an ON signal;
   main circuit means for selecting for operation either said first drive means to raise said vehicle height or said second drive means to lower said vehicle height in response to said directional signal, and for determining whether or not said drive means is to be actuated;
   holding circuit means, connected between said second detecting means and said main circuit means, for increasing the duration of said OFF signal for a predetermined length of time when said OFF signal appears instantaneously, and for transmitting said OFF signal with said duration to said main circuit means; and
   said holding circuit means comprising a monostable multivibrator connected so as to receive said command signal from said second detecting means, and an OR gate connected so as to receive said command signal from said second detecting means and an output from said monostable multivibrator.

2. A control circuit according to claim 1, wherein:
   at least two pairs of said first detecting means and said second detecting means are provided at a plurality of points of said vehicle body requiring height adjustment;
   a pneumatic means is provided at each of said points; and
   a valving means is provided between each of said drive means and each of said pneumatic means.

3. A control circuit according to claim 1 or 2, wherein:
   each of said first detecting means and said second detecting means comprises an optical system including a light-emitting element, a light-receiving element, and a light-shielding plate having a light-passing part therein.

4. A control circuit according to claim 1 or 2, wherein:
   each of said first detecting means and said second detecting means is operated by means of magnetism.

5. A control circuit according to claim 1 or 2, wherein:
   each of said first detecting means and said second detecting means comprises an on-off circuit operated by means of high frequency oscillation.

6. A control circuit according to claim 2, wherein:
   two pairs of said first detecting means and said second detecting means are provided; and
   one of said two pairs is disposed at the front of said vehicle body, and the other of said two pairs is disposed at the rear of said vehicle body.

7. A control circuit according to claim 3, wherein:
   said light-shielding plate is common to said first detecting means and said second detecting means.

8. A control circuit according to claim 3, wherein:
   said light-emitting element and said light-receiving element are disposed on a non-elastically-supported component; and
   said light-shielding plate is disposed on an elastically-supported component.

* * * * *